3,321,524
1 - ANILINO - 1 - (2 - CHLORO - 6 - HYDROXY - p-TOLYL) - 14 - [2,4,6 - TRICHLORO - 3 - {2 - HYDROXY - 3 - <2,4,6 - TRICHLORO - 3 - [2 - HYDROXY - 3 - (2,4,6 - TRICHLOROPHENOXY)PROPYL]PHENOXY>PROPYL}PHENOXY]
Jakob Harich, 31 S. Cortez Ave.,
North Orlando, Fla. 32808
No Drawing. Filed Nov. 21, 1963, Ser. No. 325,467
2 Claims. (Cl. 260—570.6)

This invention relates generally to an antimicrobial agent, and more specifically to an essentially non-toxic compound having particularly effective antibacterial and antifungal properties.

This application is a continuation-in-part of my copending application Ser. No. 263,398, filed Mar. 9, 1963, and entitled Antimicrobial Agent and Method of Using Same, now abandoned.

It is a principal object of this invention to provide a compound having a wide range of antibacterial and antifungal activity.

It is another object of this invention to provide an essentially non-toxic antimicrobial agent.

It is still another object of this invention to provide a method of producing an essentially non-toxic antimicrobial agent having a wide range of antibacterial and antifungal activity.

It is a further object of this invention to provide a method of using the antimicrobial agent of this invention.

In accordance with this instant invention, I have found that a compound having the following structural formula possesses outstanding antimicrobial properties while being essentially non-toxic:

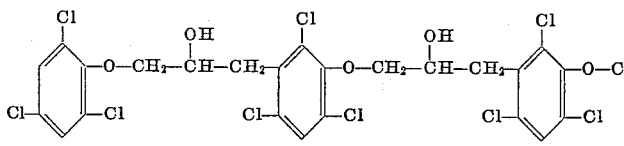 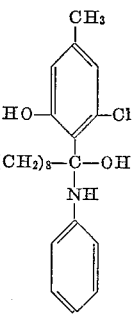

and I have given the following systematic name to this compound: 1 - anilino - 1 - (2-chloro-6-hydroxy-p-tolyl)-14-{2,4,6-trichloro-3-{2-hydroxy-3-<2,4,6-trichloro-3-[2-hydroxy - 3 - (2,4,6-trichlorophenoxy)propyl] phenoxy>propyl}phenoxy}.

This compound is a liquid having a pH of 4.5 and a specific gravity of 1.085. Its #4 Ford cup viscosity is 10 seconds and its Tag open cup flash point is 150° F.

In producing a yield of 1 gallon of this compound, for example, I preferably begin by thoroughly mixing together 5 oz. (4.6 parts by weight) of isopropyl-2,4,5-trichlorophenoxyacetate (practical); 1 oz. (0.9 part by weight) 5-chlorosalicylanilide (practical); and 5 oz. (4.6 parts by weight) of 2-chloro-4-phenylphenol (practical) with slow agitation for about 5 minutes. Thereafter, 16 fluid oz. (24.0 parts by weight) of tetrachloroethylene (stabilized with 1 part per 1000 ethanol) is added with continued slow agitation for about an additional two minutes or until a solution is obtained. Thereafter, 1 fluid oz. (0.7 part by weight) of 2-chlorobutane (highest purity) and 100 fluid oz. (65.2 parts by weight) of isopropanol (91%) are simultaneously added and the agitation speed is increased to about 150 r.p.m. and continued for several minutes until a solution is obtained. For best results, the solution is then filtered through a 10 micron stainless steel filter to insure its purity.

The following specific descriptions of experiments carried out will serve to illustrate the antibacterial and antifungal effectiveness of the above described compound, as well as the non-toxic nature thereof.

EXPERIMENT I

*In vitro study of antibacterial and antifungal properties*

Twenty-four hour cultures that had been previously sub-cultured for two consecutive days were used in this study. The following organisms were used:

Klebsiella pneumoniae, ATCC–10031
Escherichia coli, ATCC–9637
Salmonella schottmuelleri, ATCC–8759
Salmonella typhosa, ATCC–6539
Shigella flexneri, ATCC–9199
Staphylococcus aureus, ATCC–6538
Proteus vulgaris, ATCC–8427
Candida albicans, ATCC–752
Aspergillus niger, QMRDC–458
Penicillium funiculosum, QMRDC–474
Mycobacterium smegmatis, ATCC–607 [1] (5 day culture)

[1] *Mycobacterium smegmatis* is the now avirulent progeny of the original Koch bacillus.

The bacterial species were seeded into sterile enriched nutrient agar at the rate of 1.0 ml. per 20 ml. of media. The yeast and mold cultures were swabbed in the surface of Sabourand's agar. Each plate was divided into quadrants and to the center of each quadrant was added a sterile piece of filter paper, 1.0 cm.$^2$ in size. One such filter disc served as a control, and to the remaining three discs were added varying amounts of my above described antimicrobial compound, as follows:

Control—nothing added
1—0.01 ml. (0.8 mg. active)
2—0.02 ml. (1.6 mg. active)
3—0.03 ml. (2.4 mg. active)

The bacterial plates were incubated for 24 hours at 37.5 degrees C. and the yeast and mold plates were incubated at 22–25 degrees C. The results in both cases were recorded according to the zone of inhibition, such zones being measured as the average diameter.

In all instances the control square showed no inhibition of growth while effective inhibition was clearly demonstrated in every other square of each plate. The zones of inhibition are expressed for each organism in Table A.

TABLE A

[Zone of inhibition, diameter in mm.]

| Organism | 0.8 mg. | 1.6 mg. | 2.4 mg. |
|---|---|---|---|
| Klebsiella pneumoniae | 14 | 22 | 25 |
| Escherichia coli | 18 | 18 | 18 |
| Salmonella schottmuelleri | 14 | 22 | 25 |
| Salmonella typhosa | 13 | 11 | 12 |
| Staphylococcus aureus | 30 | 30 | 33 |
| Shigella flexneri | 20 | 20 | 24 |
| Proteus vulgaris | 22 | 22 | 28 |
| Candida albicans | 21 | 24 | 28 |
| Aspergillus niger | 30 | 35 | 36 |
| Penicillium funiculosum | 29 | 31 | 36 |
| Mycobacterium smegmatis | 36 | 40 | 54 |

EXPERIMENT II

In virto study of antifungal properties

Seven day cultures of *Aspergillus niger, Aspergillus tamarii, Aspergillus terreus, Memnoniella echinata, Penicillium funiculosum* and *Penicillium ochrochloron* and a 48-hour culture of *Candida albicans* were used as the test organisms. In each instance a 1–9 dilution of my above described antimicrobial compound was used and into it was inoculated sufficient organism so that the final concentration of organism in the mixture was greater than 1,000,000 organisms per 0.1 ml. Each organism was then sub-cultured from the antimicrobial solution into dextrose enriched nutrient broth and on Czapek-Dox broth and these cultures were incubated at 22–25 degrees C. Control cultures from each original organism culture were prepared using dextrose enriched nutrient agar and Czapek-Dox agar. The control cultures were also incubated under the same conditions.

As a result of the foregoing, it was found that my antimicrobial compound was capable of killing the test organisms in all instances following a three minute contact time.

EXPERIMENT III

Germination studies on spores

Dilutions of my above described antimicrobial compound were prepared so that the active components were diluted as indicated in the table below. Spores of *Aspergillus niger* were then inoculated into each dilution and thoroughly mixed. The contact time for each dilution was 2 minutes.

One loopful of each spore containing solution was then transferred to a sterile coverslip and allowed to dry. The dried spores were then covered with a small block of sterile Sabourand's dextrose agar. Each coverslip was then inverted into a sterile glass cup and the thus formed chambers were then sealed using "Vaseline." These spore chambers were incubated at 22–25 degrees C. and examined after 6 hours, 20 hours, 48 hours and 72 hours. The growth was recorded (a) as beginning germination, (b) germination where approximately 50% of the spores had germinated, and (c) maximum germination where almost all spores had germinated. The results are shown in Table B where (−) indicated no growth; (+) indicates germination in some spores; (++) indicates germination in approximately 50% of the spores; and (+++) indicates maximum germination.

TABLE B

| Dilution Ratio | Incubation Time | | | |
|---|---|---|---|---|
|  | 6 hours | 20 hours | 48 hours | 72 hours |
| Control | − | ++ | ++ | +++ |
| 1-800 | − | + | ++ | +++ |
| 1-400 | − | − | + | ++ |
| 1-200 | − | − | + | + |
| 1-150 | − | − | + | + |
| 1-100 | − | − | + | + |
| 1-50 | − | − | − | − |
| 1-40 | − | − | − | − |
| 1-20 | − | − | − | − |
| 1-10 | − | − | − | − |

EXPERIMENT IV

Fumigant properties against fungi

A test organism, *Aspergillus niger*, was inoculated onto Sabourand's dextrose agar by means of a sterile swab to insure a heavy inoculum in each case. One plate was incubated at 22–25 degrees C. and served as a control. A second plate was placed into a closely covered environment of 3,915 cc. to which had been added the following measured amounts of my above described antimicrobial compound:

|  | Amount, ml. | Concentration, mg./cu. ft. |
|---|---|---|
| A | 5.0 | 3,226 |
| B | 2.5 | 1,613 |
| C | 1.0 | 645 |
| D | 0.75 | 484 |
| E | 0.50 | 323 |
| F | 0.25 | 161 |

This type of fumigant chamber was used throughout the test and all units were incubated for at least 72 hours at 22–25 degrees C.

As a result of the foregoing, the *Aspergillus niger* was completely inhibited from growing in all concentrations down to 161 mg./cu. ft., at which concentration growth developed slowly. Subsequently, the plates were removed from the inhibitory atmosphere and allowed to incubate an additional 3 days with a result that no evidence of growth developed in any of the plates that previously had shown no growth. The sporulation of the control plates continued, however.

EXPERIMENT V

Acute toxicity

The purpose of this experiment was to calculate an $LD_{50}$ for oral administration for my above-described antimicrobial compound. In this procedure a single dose of said compound was administered by means of a stomach tube attached to a metering device to MF–1 white rats (average weight 100–110 grams), which had been fasting overnight. There were 5 animals of alternating sex in each test group—the first test group (10,000 mg./kg.) having 3 males and 2 females; the next test group having 2 males and 3 females, etc. The greatest volume of compound used was 1.0 ml., which represents 10 ml./kg. of body weight for the test animals. This was varied downwardly to 3 ml./kg. of body weight per test animal. For purposes of calculation of body weight dosages, 1.0 ml. was taken to equal 1.0 gram. The results obtained were recorded in Table C.

TABLE C

| Number of Animals | Ml./animal | Mg./kg. | Mortality |
|---|---|---|---|
| 5 | 1.0 | 10,000 | [1] 5/5 |
| 5 | 0.8 | 8,000 | [2] 5/5 |
| 5 | 0.6 | 6,000 | 4/5 |
| 5 | 0.5 | 5,000 | 1/5 |
| 5 | 0.4 | 4,000 | 0/5 |
| 5 | 0.3 | 3,000 | 1/5 |

[1] Rapid, heavy respiration, animal very inactive. Onset of symptons occurred within 15 minutes after administration.
[2] Heavy respiration, deaths occurred during first 24 hours.

The animals that expired in this study were examined by autopsy to ascertain whether or not the material actually was deposted in the stomach. In all cases, there was no evidence of lung damage and in the early deaths prior to absorption, the material could be demonstrated in the stomach cavity. After the study, all surviving animals were in good health, active and in good appetite.

From the results in Table C, the $LD_{50}$ is statistically calculated as follows:

|               | 10,000 Mg./kg. | 8,000 Mg./kg. | 6,000 Mg./kg. | 5,000 Mg./kg. | 4,000 Mg./kg. | 3,000 Mg./kg. |
|---|---|---|---|---|---|---|
| Mortality | 5/5 | 5/5 | 4/5 | 1/5 | 0/5 | 1/5 |
| Accumulated dead | 16 | 11 | 6 | 2 | 1 | 1 |
| Accumulated living | 0 | 0 | 1 | 5 | 10 | 14 |
| Accumulated totals | 16/16 | 11/11 | 6/7 | 2/7 | 1/11 | 1/15 |
| Percent | | | 85.7% | 28.6% | | |

$$LD_{50} = \frac{85.7 - 50.0}{85.7 - 28.6} = \frac{35.7}{57.1} = 5{,}625 \text{ mg./kg.}$$

As can readily be seen from the foregoing experiments, the antimicrobial compound of this invention is useful in combatting a broad range of bacteria and fungi, which usefulness is greatly enhanced by the non-toxic nature of the agent.

I claim:
1. 1 - anilino-1-(2-chloro-6-hydroxy-p-tolyl)-14-{2,4,6-trichloro-3-{2-hydroxy-3<2,4,6-trichloro-3-[2-hydroxy-3-(2,4,6 - trichlorophenoxy)propyl] phenoxy>propyl}phenoxy}.

2. The method of producing an antimicrobial agent which consists of combining:

| | Parts by weight |
|---|---|
| Isopropyl-2,4,5-trichlorophenoxyacetate | 4.6 |
| 5-chlorosalicylanilide | 0.9 |
| 2-chloro-4-phenylphenol | 4.6 |
| Tetrachloroethylene | 24.0 |
| 2-chlorobutane | 0.7 |
| Isopropanol (91%) | 65.2 |

References Cited by the Examiner

UNITED STATES PATENTS

| 2,285,950 | 6/1942 | Sullivan et al. | 167—39 |
| 2,362,472 | 11/1944 | Dreisbach et al. | 167—39 |
| 2,583,425 | 1/1952 | Hawley | 167—30 |
| 2,653,895 | 9/1953 | Drake et al. | 167—30 |
| 2,725,399 | 11/1955 | Denton | 260—570.6 |
| 2,776,993 | 1/1957 | Alles | 260—570.6 |

CHARLES B. PARKER, *Primary Examiner.*
ROBERT V. HINES, *Assistant Examiner.*